US012264039B2

(12) United States Patent
Vishal

(10) Patent No.: US 12,264,039 B2
(45) Date of Patent: Apr. 1, 2025

(54) SUSPENSION ARRANGEMENT TO ABSORB STRESS ACTING ON AN ELEVATOR CABIN DURING LANDING

(71) Applicant: Ruphavathy Vishal, Chennai (IN)

(72) Inventor: Ruphavathy Vishal, Chennai (IN)

(73) Assignee: Ruphavathy Vishal (IN)

( * ) Notice: Subject to any disclaimer, the term of this patent is extended or adjusted under 35 U.S.C. 154(b) by 0 days.

(21) Appl. No.: 18/374,089

(22) Filed: Sep. 28, 2023

(65) Prior Publication Data

US 2024/0253948 A1 Aug. 1, 2024

(51) Int. Cl.
*B66B 11/02* (2006.01)
*B66B 9/04* (2006.01)

(52) U.S. Cl.
CPC ............ *B66B 11/0266* (2013.01); *B66B 9/04* (2013.01)

(58) Field of Classification Search
CPC .............................. B66B 11/0266; B66B 9/04
See application file for complete search history.

(56) References Cited

FOREIGN PATENT DOCUMENTS

| | | | | | |
|---|---|---|---|---|---|
| CN | 2031394 | U | * | 1/1989 | |
| CN | 2765889 | Y | * | 3/2005 | |
| CN | 203199847 | U | * | 9/2013 | |
| CN | 103910273 | A | * | 7/2014 | |
| CN | 203740830 | U | | 7/2014 | |
| CN | 208071051 | U | | 11/2018 | |
| CN | 109678029 | A | | 4/2019 | |
| CN | 210558780 | U | | 5/2020 | |
| WO | WO-2021245456 | A1 | * | 12/2021 | ............ B66B 1/365 |

OTHER PUBLICATIONS

Machine translation of CN 203199847.*
Machine translation of CN 203740830.*

* cited by examiner

*Primary Examiner* — Diem M Tran
(74) *Attorney, Agent, or Firm* — Jason C. Cameron

(57) ABSTRACT

A suspension arrangement 10 to absorb stress acting on an elevator cabin 20 during landing is provided. The suspension arrangement includes the elevator cabin to move bidirectionally through an external cylinder 30 to transport passengers between levels of a structure. The suspension arrangement includes a landing lever 40 to project towards the external cylinder when the elevator cabin reaches a floor level. The suspension arrangement includes a landing bar 50 to slide downwards over the pillar 60 corresponding to a motion of the landing lever upon establishing a contact with the landing lever projected towards the external cylinder. The suspension arrangement includes a guide pin 70 meshed with the landing bar and housed in a base ring 80 associated with the external cylinder. The guide pin is to compress a spring 90 encircling the guide pin corresponding to the motion of the landing bar.

7 Claims, 3 Drawing Sheets

SUSPENSION ARRANGEMENT TO ABSORB STRESS ACTING ON AN ELEVATOR CABIN DURING LANDING

CROSS-REFERENCE TO RELATED APPLICATION

This application claims priority from a Patent application filed in India having Patent Application No. 202341006421, filed on Feb. 1, 2023, and titled "A SUSPENSION ARRANGEMENT TO ABSORB STRESS ACTING ON AN ELEVATOR CABIN DURING LANDING".

FIELD OF INVENTION

Embodiments of the present disclosure relate to a field of elevators and more particularly to a suspension arrangement to absorb stress acting on an elevator cabin during landing.

BACKGROUND

An elevator is a machine which transports people and freights between different levels of a structure. The structure may include a building, a maritime vessel and the like. The elevator may be classified as a cable-assisted elevator, a hydraulic cylinder-assisted elevator, and a pneumatic vacuum elevator based on an actuation method of the elevator. Cables attached to an elevator cabin may be used to actuate the cable-assisted elevator. Similarly, hydraulic pistons associated with the elevator cabin may be used to actuate the hydraulic cylinder-assisted elevator. The pneumatic vacuum elevator utilizes vacuum created in an external cylinder to move the elevator cabin through the external cylinder.

A shaft controller located in the external cylinder may actuate motors to create the vacuum inside the external cylinder corresponding to inputs provided by the people through the elevator cabin to move the elevator cabin to a floor level preferred by the people. Landing of the elevator cabin at the floor level preferred by the people includes locking the elevator cabin in motion at the floor level preferred by the people through one or more mechanical components. The mechanical components may include mechanical brakes, friction pads, and the like. Stress may develop on the elevator cabin due to retardation caused by the mechanical components, which may eventually cause structural damages to the elevator cabin. Also, the stress may lead to formation of mechanical vibrations which may affect wellbeing of the people travelling in the elevator. Further, the stress may cause wear and tear of the mechanical components, thereby increasing frequency of maintenance and a cost thereof.

Hence, there is a need for an improved suspension arrangement to absorb stress acting on an elevator cabin during landing to address the aforementioned issue(s).

BRIEF DESCRIPTION

In accordance with an embodiment of the present disclosure, a suspension arrangement to absorb stress acting on an elevator cabin during landing is provided. The suspension arrangement includes the elevator cabin positioned in an external cylinder of a pneumatic vacuum elevator. The elevator cabin is adapted to move bidirectionally through the external cylinder to transport one or more passengers between one or more levels of a structure. The suspension arrangement also includes a landing lever mechanically coupled to a top portion of the elevator cabin. The landing lever is adapted to project towards the external cylinder when the elevator cabin reaches a floor level preferred by the one or more passengers. The suspension arrangement further includes a landing bar operatively coupled to the landing lever and mounted on a pillar of the external cylinder. The landing bar is adapted to slide downwards over the pillar corresponding to a motion of the landing lever upon establishing a contact with the landing lever projected towards the external cylinder. The suspension arrangement also includes a guide pin meshed with the landing bar and housed in a base ring associated with the external cylinder. The guide pin is adapted to compress a spring encircling the guide pin corresponding to the motion of the landing bar, thereby absorbing the stress acting on the elevator cabin during the landing.

To further clarify the advantages and features of the present disclosure, a more explicit description of the disclosure will follow by reference to specific embodiments thereof, which are illustrated in the appended figures. It is to be appreciated that these figures depict typical embodiments of the disclosure and are therefore not to be considered limiting in scope. The disclosure will be described and explained with additional details with the appended figures.

BRIEF DESCRIPTION OF THE DRAWINGS

The disclosure will be described and explained with additional specificity and detail with the accompanying figures in which.

Figure 1:
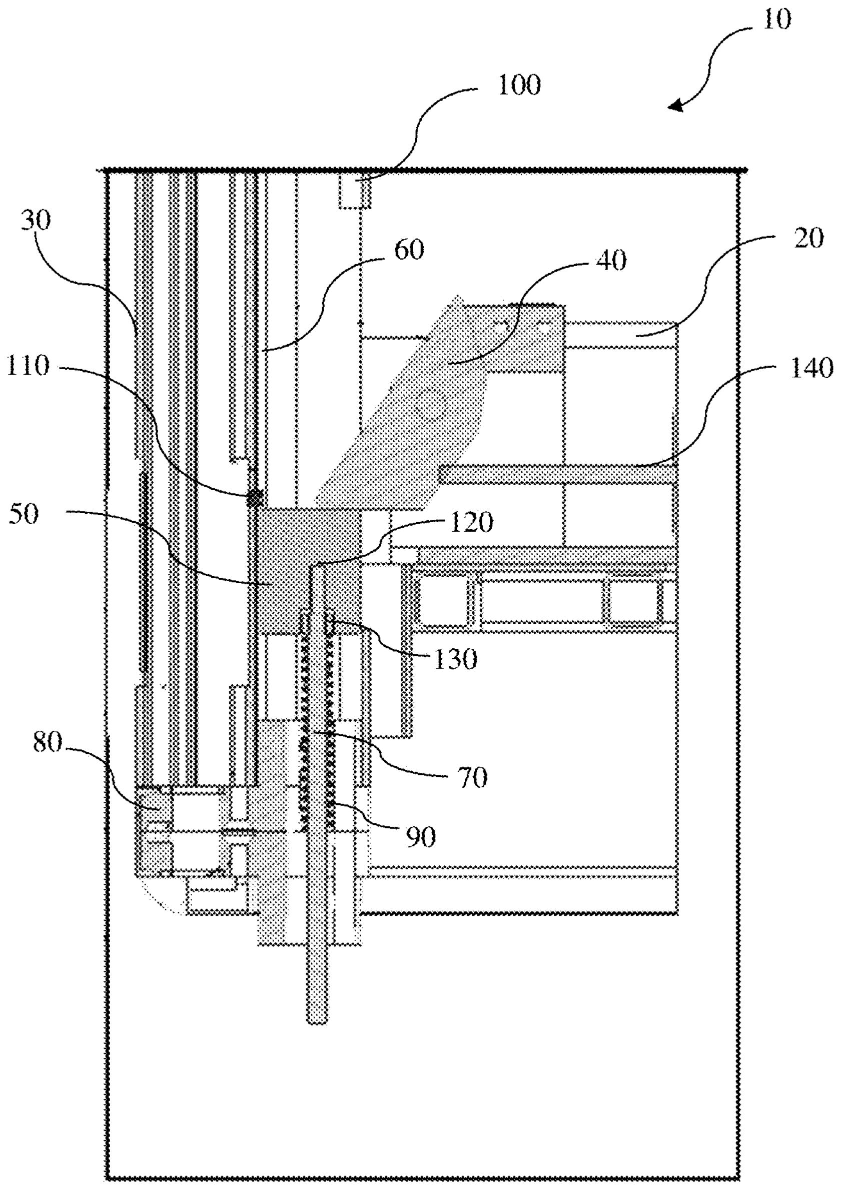
FIG. 1 is a schematic representation of a suspension arrangement to absorb stress acting on an elevator cabin during landing in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

To promote an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a suspension arrangement to absorb stress acting on an elevator cabin during landing. The suspension arrangement includes the elevator cabin positioned in an external cylinder of a pneumatic vacuum elevator. The elevator cabin is adapted to move bidirectionally through the external cylinder to transport one or more passengers between one or more levels of a structure. The suspension arrangement also includes a landing lever mechanically coupled to a top portion of the elevator cabin. The landing lever is adapted to project towards the external cylinder when the elevator cabin reaches a floor level preferred by the one or more passengers. The suspension arrangement further includes a landing bar operatively coupled to the landing lever and mounted on a pillar of the external cylinder. The landing bar is adapted to slide downwards over the pillar corresponding to a motion of the landing lever upon establishing a contact with the landing lever projected towards the external cylinder. The suspension arrangement also includes a guide pin meshed with the landing bar and housed in a base ring associated with the external cylinder. The guide pin is adapted to compress a spring encircling the guide pin corresponding to the motion of the landing bar, thereby absorbing the stress acting on the elevator cabin during the landing.

FIG. 1 is a schematic representation of a suspension arrangement 10 to absorb stress acting on an elevator cabin 20 during landing in accordance with an embodiment of the present disclosure. The suspension arrangement 10 includes the elevator cabin 20 positioned in an external cylinder 30 of a pneumatic vacuum elevator. The elevator cabin 20 is adapted to move bidirectionally through the external cylinder 30 to transport one or more passengers between one or more levels of a structure. In one embodiment, the structure may include, but not limited to, a building, a maritime vessel and the like. The suspension arrangement 10 also includes a landing lever 40 mechanically coupled to a top portion of the elevator cabin 20. The landing lever 40 is adapted to project towards the external cylinder 30 when the elevator cabin 20 reaches a floor level preferred by the one or more passengers.

Further, in one embodiment, the one or more passengers may provide one or more inputs to a cabin controller (not shown in FIG. 1) via a landing operating panel (not shown in FIG. 1) positioned in the elevator cabin 20. In such an embodiment, the one or more inputs may be the floor level preferred by the one or more passengers. In one embodiment, the cabin controller may be positioned in a first predefined portion of the external cylinder 30. In a specific embodiment, the cabin controller may be adapted to actuate one or more motors (not shown in FIG. 1) to create vacuum in the external cylinder 30 to move the elevator cabin 20 corresponding to the one or more inputs provided by the one or more passengers.

Furthermore, in one embodiment, the landing lever 40 may be adapted to retract towards the elevator cabin 20 upon establishing the contact with a projection 100 associated with the external cylinder 30. In some embodiments, the landing lever 40 may be pivoted to the top portion of the elevator cabin 20 at a proximal end of the landing lever 40 to provide an angular motion to the landing lever 40 during the projection 100 and retraction of the landing lever 40 with respect to the elevator cabin 20. The suspension arrangement 10 further includes a landing bar 50 operatively coupled to the landing lever 40 and mounted on a pillar 60 of the external cylinder 30.

Moreover, the landing bar 50 is adapted to slide downwards over the pillar 60 corresponding to a motion of the landing lever 40 upon establishing a contact with the landing lever 40 projected towards the external cylinder 30. In one embodiment, the pillar 60 may include a grub screw 110 adapted to restrict an upward movement of the landing bar 50 over the pillar 60. As used herein, the grub screw may be defined as a fastener used to secure an item against another item without a nut. The suspension arrangement 10 also includes a guide pin 70 meshed with the landing bar 50 and housed in a base ring 80 associated with the external cylinder 30. In one embodiment, the base ring 80 may be used to interconnect the external cylinder 30 with similar units. The guide pin 70 is adapted to compress a spring 90 encircling the guide pin 70 corresponding to the motion of the landing bar 50, thereby absorbing the stress acting on the elevator cabin 20 during the landing.

Additionally, in some embodiments, the landing bar 50 may include a counter boring 120 adapted to accommodate the guide pin 70 and a nut 130 fastened to the guide pin 70. As used herein, counter boring 120 may be a slot provided on the landing bar 50 to accommodate the guide pin 70 and the nut 130 In a specific embodiment, the guide pin 70 may include a threaded portion to fasten the nut 130 adapted to transfer the motion of the guide pin 70 to the spring 90. In one embodiment, the guide pin 70 may be adapted to open a door of the elevator cabin 20 upon compressing the spring 90. In a specific embodiment, the spring 90 may include a compression spring. In some embodiments, the spring 90 may include, but not limited to, extension spring, torsion spring, spiral spring, and the like.

Figure 2:
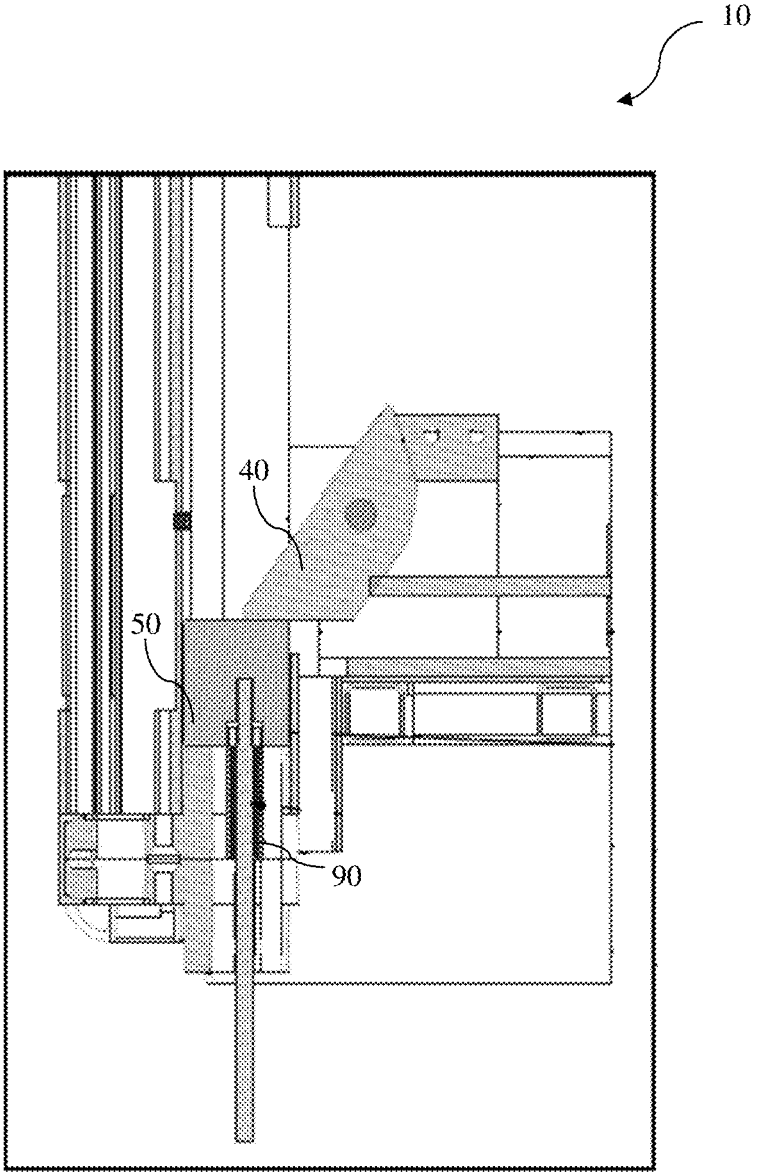
FIG. 2 is a schematic representation of yet another embodiment of the suspension arrangement of FIG. 1, depicting relative position of a landing lever, and a landing bar when a spring is in a compressed state in accordance with an embodiment of the present disclosure.

Also, in some embodiments, the suspension arrangement 10 may include a solenoid valve (not shown in FIG. 1) mechanically coupled to the elevator cabin 20 through a lever 140. In such an embodiment, the solenoid valve may be adapted to force the landing lever 40 to project towards the external cylinder 30 when the elevator cabin 20 reaches the floor level preferred by the one or more passengers. Relative position of the landing lever 40, and the landing bar 50 when the spring 90 is in a compressed state is shown in FIG. 2.

Figure 3:
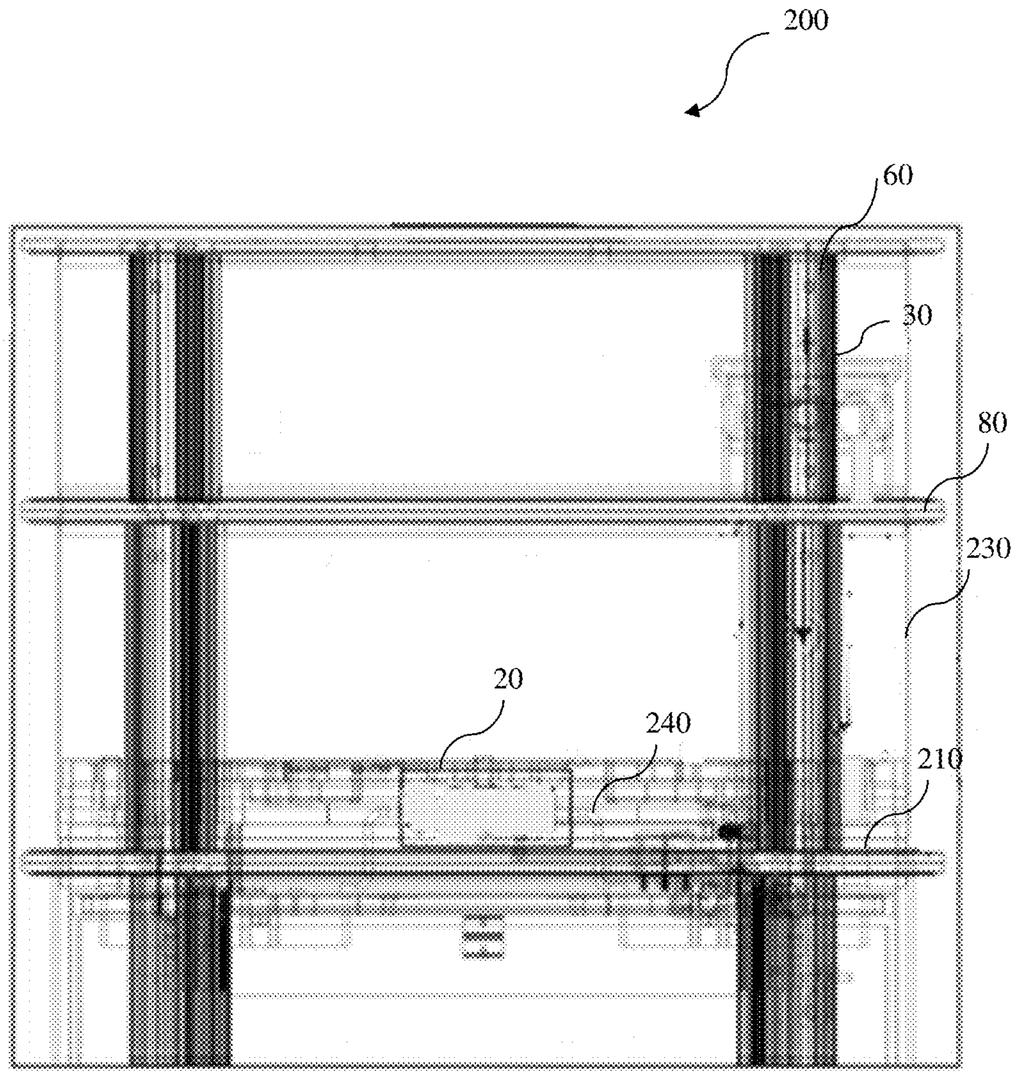
FIG. 3 is a schematic representation of a pneumatic vacuum elevator in accordance with an embodiment of the present disclosure.

FIG. 3 is a schematic representation of a pneumatic vacuum elevator 200 in accordance with an embodiment of the present disclosure. The pneumatic vacuum elevator 200 includes an elevator cabin 20 positioned in an external cylinder 30. The elevator cabin 20 is adapted to move bidirectionally through the external cylinder 30 to transport one or more passengers between one or more levels of a structure. The external cylinder 30 includes a plurality of cylinders coupled using a base ring 80 and a band ring 210. The pneumatic vacuum elevator 200 also includes a landing lever 40 mechanically coupled to a top portion of the elevator cabin 20. The landing lever 40 is adapted to project towards the external cylinder 30 when the elevator cabin 20 reaches a floor level preferred by the one or more passengers.

Further, the pneumatic vacuum elevator 200 also includes a landing lever 40 operatively coupled to the landing lever 40 and mounted on a pillar 60 of the external cylinder 30. The landing bar 50 is adapted to slide downwards over the pillar 60 corresponding to a motion of the landing lever 40 upon establishing a contact with the landing lever 40 projected towards the external cylinder 30. The pneumatic vacuum elevator 200 also includes a guide pin 70 meshed with the landing bar 50 and housed in the base ring 80 associated with the external cylinder 30. The guide pin 70 is adapted to compress a spring 90 encircling the guide pin 70 corresponding to the motion of the landing bar 50, thereby absorbing the stress acting on the elevator cabin 20 during landing.

Furthermore, the pillar 60 is positioned adjacent to the guide pin 70 and mechanically coupled to the elevator cabin 20. The pillar 60 is disposed at the external cylinder 30. The pillar 60 is configured to guide an actuation of the elevator cabin 20. The pneumatic vacuum elevator 200 also includes a polycarbonate sheet 230 configured to cover the external cylinder 30. The polycarbonate sheet 230 and the external cylinder 30 is coupled using a first locking device and a second locking device. The first locking device is configured to lock an air gap between the polycarbonate sheet 230, the base ring 80 and the external cylinder 30. The second locking device is configured to lock air gap between the polycarbonate sheet 230 and the pillar 60.

Moreover, the pneumatic vacuum elevator 200 further includes a seal assembly 240 adapted to fit over a top portion of the elevator cabin 20. The seal assembly 240 is configured to seal the elevator cabin 20 to reduce vibrations during upward and downward movement of the elevator cabin 20. The seal assembly 240 includes a depressurizing system configured to prevent the elevator cabin 20 from coming into force contact with the external cylinder 30 assembly during upward movement and contribute to safety of an elevator operation.

Various embodiments of the suspension arrangement to absorb stress acting on an elevator cabin during landing described above enable various advantages. Provision of the landing lever, the landing bar, the guide pin and the spring is capable of absorbing the stress acting on the elevator cabin during the landing, thereby protecting the elevator cabin from the structural damages which may have caused due to the stress. Also, by absorbing the stress acting on the elevator cabin, the landing lever, the landing bar, the guide pin and the spring are capable of reducing the formation of mechanical vibrations of the elevator cabin, thereby contributing to the wellbeing of the people travelling in the elevator. The suspension arrangement is also reducing the wear and tear of the mechanical components associated with the pneumatic elevator by absorbing the stress, thereby reducing the frequency of the maintenance and the cost thereof.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and is not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A suspension arrangement (10) to absorb stress acting on an elevator cabin (20) during landing, wherein the suspension arrangement (10) comprises:

the elevator cabin (20) positioned in an external cylinder (30) of a pneumatic vacuum elevator, wherein the elevator cabin (20) is adapted to move bidirectionally through the external cylinder (30) to transport one or more passengers between one or more levels of a structure;

a landing lever (40) mechanically coupled to a top portion of the elevator cabin (20), wherein the landing lever (40) is adapted to project towards the external cylinder (30) when the elevator cabin (20) reaches a floor level preferred by the one or more passengers, wherein the landing lever (40) is adapted to retract towards the elevator cabin (20) upon establishing the contact with a projection (100) associated with the external cylinder (30);

a landing bar (50) operatively coupled to the landing lever (40) and mounted on a pillar (60) of the external cylinder (30), wherein the landing bar (50) is adapted to slide downwards over the pillar (60) corresponding to a motion of the landing lever (40) upon establishing a contact with the landing lever (40) projected towards the external cylinder (30), wherein the landing bar (50) comprises a counter boring (120) adapted to accommodate the guide pin (70) and a nut (130) fastened to the guide pin (70);

a guide pin (70) meshed with the landing bar (50) and housed in a base ring (80) associated with the external cylinder (30), wherein the guide pin (70) is adapted to compress a spring (90) encircling the guide pin (70) corresponding to the motion of the landing bar (50), thereby absorbing the stress acting on the elevator cabin (20) during the landing; and a grub screw (110) adapted to restrict an upward movement of the landing bar (50) over the pillar (60).

2. The suspension arrangement (10) as claimed in claim 1, wherein the landing lever (40) is pivoted to the top portion of the elevator cabin (20) at a proximal end of the landing lever (40) to provide an angular motion to the landing lever (40) during the projection (100) and retraction of the landing lever (40) with respect to the elevator cabin (20).

3. The suspension arrangement (10) as claimed in claim 1, wherein the guide pin (70) comprises a threaded portion to fasten a nut (130) adapted to transfer the motion of the guide pin (70) to the spring (90).

4. The suspension arrangement (10) as claimed in claim 1, wherein the guide pin (70) is adapted to open a door of the elevator cabin (20) upon compressing the spring (90).

5. The suspension arrangement (10) as claimed in claim 1, wherein the spring (90) comprises a compression spring.

6. The suspension arrangement (10) as claimed in claim 1, comprising a solenoid valve mechanically coupled to the elevator cabin (20) through a lever (140), wherein the solenoid valve is adapted to force the landing lever (40) to project towards the external cylinder (30) when the elevator cabin (20) reaches the floor level preferred by the one or more passengers.

7. A pneumatic vacuum elevator (200) comprising:

an elevator cabin (20) positioned in an external cylinder (30), wherein the elevator cabin (20) is adapted to move bidirectionally through the external cylinder (30) to transport one or more passengers between one or more levels of a structure, wherein the external cylinder (30) comprises a plurality of cylinders coupled using a base ring (80) and a band ring (210) assembly;

a landing lever (40) mechanically coupled to a top portion of the elevator cabin (20), wherein the landing lever (40) is adapted to project towards the external cylinder (30) when the elevator cabin (20) reaches a floor level preferred by the one or more passengers, wherein the landing lever (40) is adapted to retract towards the elevator cabin (20) upon establishing the contact with a projection (100) associated with the external cylinder (30), wherein the landing bar (50) comprises a counter boring (120) adapted to accommodate the guide pin (70) and a nut (130) fastened to the guide pin (70);

a landing bar (50) operatively coupled to the landing lever (40) and mounted on a pillar (60) of the external cylinder (30), wherein the landing bar (50) is adapted to slide downwards over the pillar (60) corresponding to a motion of the landing lever (40) upon establishing a contact with the landing lever (40) projected towards the external cylinder (30);

a guide pin (70) meshed with the landing bar (50) and housed in the base ring (80) associated with the external cylinder (30), wherein the guide pin (70) is adapted to compress a spring (90) encircling the guide pin (70) corresponding to the motion of the landing bar (50), thereby absorbing the stress acting on the elevator cabin (20) during landing, wherein the pillar (60) is positioned adjacent to the guide pin (70) and mechanically coupled to the elevator cabin (20), wherein the pillar (60) is disposed at the external cylinder (30), wherein the pillar (60) is configured to guide an actuation of the elevator cabin (20);

a polycarbonate sheet (230) configured to cover the external cylinder (30), wherein the polycarbonate sheet (230) and the external cylinder (30) is coupled using a first locking device and a second locking device, wherein the first locking device is configured to lock an air gap between the polycarbonate sheet (230), the base ring (80) and the external cylinder (30), wherein the second locking device is configured to lock air gap between the polycarbonate sheet (230) and the pillar (60); and a seal assembly (240) adapted to fit over a top portion of the elevator cabin (20), wherein the seal assembly (240) is configured to seal the elevator cabin (20) to reduce vibrations during upward and downward movement of the elevator cabin (20), wherein the seal assembly (240) comprises a depressurizing system configured to prevent the elevator cabin (20) from coming into force contact with the external cylinder (30) assembly during upward movement and contribute to safety of an elevator operation.

* * * * *